(12) United States Patent
Danzer et al.

(10) Patent No.: US 7,645,998 B2
(45) Date of Patent: Jan. 12, 2010

(54) DETECTOR MODULE, DETECTOR AND COMPUTED TOMOGRAPHY UNIT

(75) Inventors: Ludwig Danzer, Wendelstein (DE); Harald Märkl, Gerhardshofen (DE)

(73) Assignee: Siemens Aktiengesellschaft, Munich (DE)

( * ) Notice: Subject to any disclaimer, the term of this patent is extended or adjusted under 35 U.S.C. 154(b) by 177 days.

(21) Appl. No.: 11/500,954

(22) Filed: Aug. 9, 2006

(65) Prior Publication Data

US 2007/0034807 A1 Feb. 15, 2007

(30) Foreign Application Priority Data

Aug. 10, 2005 (DE) .................. 10 2005 037 902

(51) Int. Cl.
*G01T 1/20* (2006.01)
(52) U.S. Cl. .................. 250/370.11; 250/370.09; 250/370.08; 257/686
(58) Field of Classification Search ............ 250/370.11, 250/370.09, 370.08; 257/686
See application file for complete search history.

(56) References Cited

U.S. PATENT DOCUMENTS

| 6,236,050 | B1 | 5/2001 | Tümer | |
|---|---|---|---|---|
| 6,236,051 | B1 | 5/2001 | Yamakawa et al. | |
| 6,396,898 | B1 * | 5/2002 | Saito et al. | 378/19 |
| 2004/0065465 | A1 * | 4/2004 | Chappo et al. | 174/66 |
| 2004/0256709 | A1 * | 12/2004 | Hashimoto | 257/686 |
| 2005/0012047 | A1 | 1/2005 | Pohan | |
| 2005/0029463 | A1 | 2/2005 | Kaemmerer | |
| 2005/0067579 | A1 | 3/2005 | Tsuchiya et al. | |
| 2006/0011852 | A1 * | 1/2006 | El-Hanany et al. | 250/370.09 |

* cited by examiner

*Primary Examiner*—Constantine Hannaher
*Assistant Examiner*—Jessica L Eley
(74) *Attorney, Agent, or Firm*—Harness, Dickey & Pierce, P.L.C.

(57) ABSTRACT

A detector module includes an array of detector elements and a printed circuit board. On a first side of the circuit board, the array of detector elements is arranged, and on a second side at least one component used for signal processing is arranged. The printed circuit board makes electrical contact with a plug connector having a free space in which the component is held. The detector module is provided for a detector of a computed tomography unit.

24 Claims, 2 Drawing Sheets

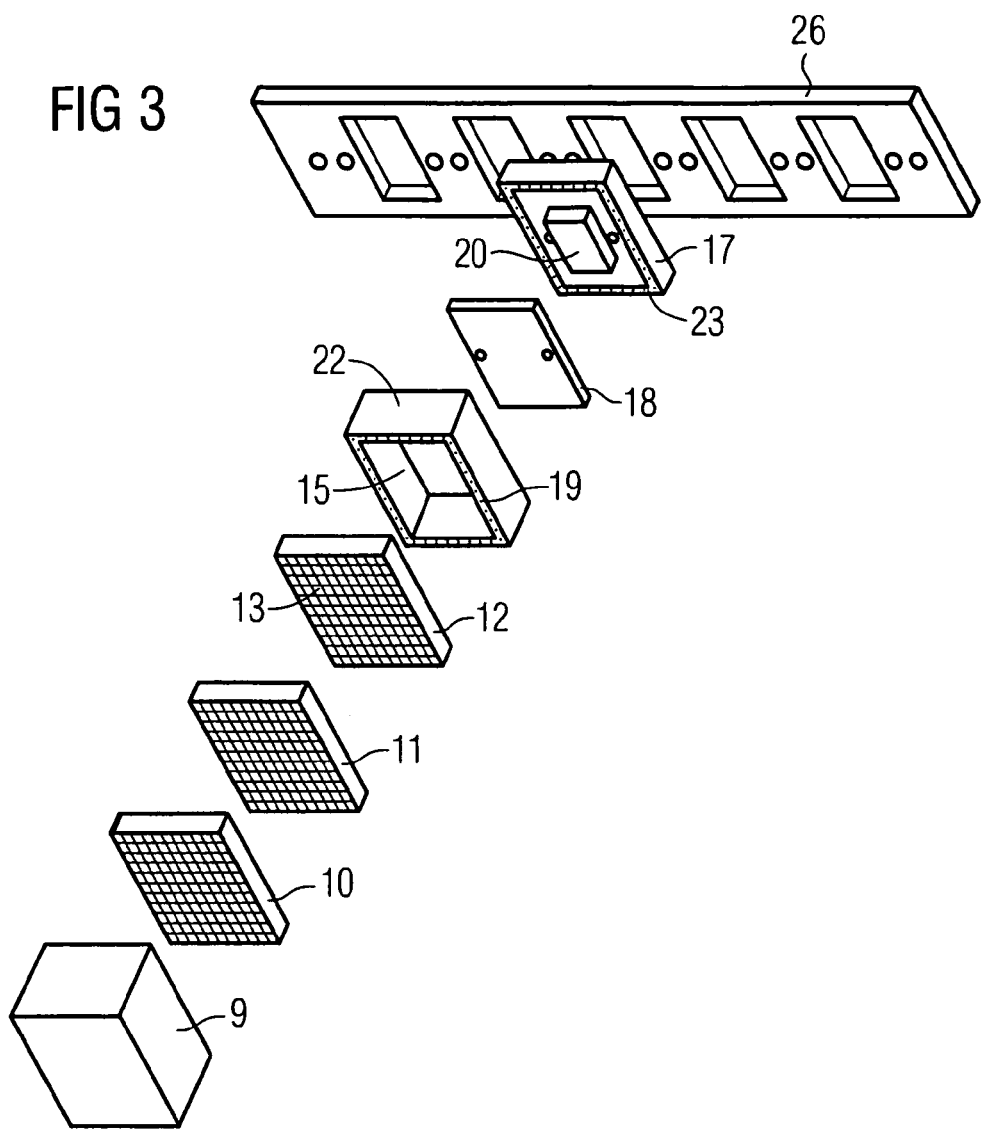
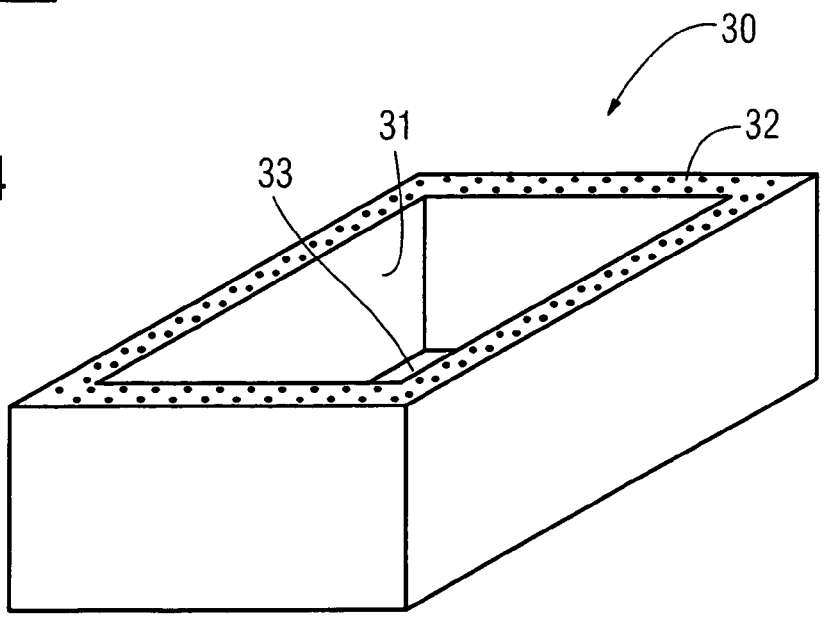

DETECTOR MODULE, DETECTOR AND COMPUTED TOMOGRAPHY UNIT

PRIORITY STATEMENT

The present application hereby claims priority under 35 U.S.C. §119 on German patent application number DE 10 2005 037 902.8 filed Aug. 10, 2005, the entire contents of which is hereby incorporated herein by reference.

FIELD

The invention generally relates to a detector module having an array of detector elements and a printed circuit board. The invention also generally relates to a detector and/or a computed tomography unit that have a detector module.

BACKGROUND

When imaging with the aid of an X-ray machine, for example with the aid of a computed tomography unit that has an X-ray system with an X-ray source and an X-ray detector, the aim is to design the detection surface of the X-ray detector available for imaging to be as large as possible in order to be able to scan entire organs, such as the heart, of a patient in a revolution of the X-ray system about the patient. Such an X-ray detector, also designated as a flat detector, is generally constructed from a multiplicity of detector modules that are juxtaposed two dimensionally in a row. Each detector module has, for example, a scintillator array and a photodiode array that are aligned with one another and form the detector elements of the detector module. The elements of the scintillator array convert the X-radiation striking them into visible light that is converted by the downstream photodiodes of the photodiode array into electric signals.

Making electric contact with the photodiodes of the detector modules or the detector elements in the case of semiconductor detectors turns out to be particularly problematical in the construction of a flat detector. Whereas in the case of a conventionally constructed X-ray detector in which individual detector modules are arranged in sequence on a circular arc, it is possible to arrange a signal processing electronic system on the side, or a cable serving to make contact with the photodiodes of a detector module can be led away at the side to a printed circuit board having a signal processing electronic system, which is to be gathered from US 2005/0029463 A1, this construction is no longer possible in the case of a flat detector, since free space is no longer present at the side owing to the two dimensional arrangement of the detector modules. It is to be noted in this case that the electronic system to be arranged as close as possible to the detector elements on grounds of measurement and used for processing the measuring signals supplied by the detector elements of the detector modules requires an area that can be two to four times larger than the detection surface of a detector module. It appears necessary for this reason to construct the detector module with the signal processing electronic system in a vertical fashion.

U.S. Pat. No. 6,396,898 B1 describes the construction of a flat detector that has a number of detector modules that are juxtaposed in a row and in each case include a so-called element module. The element modules of the detector are of vertical construction, that is to say the components of an element module comprising scintillators, photodiodes, a substrate with a signal processing electronic system and a module base plate are arranged vertically one above another.

In such a vertical construction of a detector module, it is, however, necessary to pay heed to a good heat dissipation, since otherwise the considerable development of heat during operation of the signal processing electronic system can cause damage to the electronic system.

SUMMARY

In at least one embodiment of the invention, a detector module is designed such that it is possible to construct a flat detector, and that sufficient space is present for arranging a signal processing electronic system in the vicinity of the detection surface. In at least one embodiment of the invention, a detector is constructed from such detector modules, and in at least one other embodiment, a computed tomography unit includes such a detector.

According to at least one embodiment of the invention, a detector module includes an array of detector elements and a printed circuit board, on whose first side the array of detector elements is arranged, and on whose second side at least one component used for signal processing is arranged. The printed circuit board makes electrical contact with a plug connector having a free space in which the component is held.

The detector module thus has a vertical structure, the design of the plug rendering it possible for electronic components used for signal processing to be arranged on a conventional printed circuit board near the array of detector elements. In this case, holding the components in the free space of the plug not only results in a mechanical protective action for the components, but it is also possible to implement a compact structure of a detector module. The array of detector elements, the printed circuit board and the plug are generally flush toward the outside, and so it is possible on all sides to juxtapose in rows in two dimensions.

According to one embodiment of the invention, the plug is of a frame-type design. In one embodiment, present on the topside and the underside of the frame of the plug are plug-in contacts that are electrically interconnected.

The empty interior of the frame-type plug forms the free space into which components arranged on the printed circuit board can project. The frame of the plug develops toward the outside the mechanical protective action for the components held in the free space. However, the plug can also be of a box-type structure, that is to say be open on one side and have a bottom on the other side. This variant of the plug can be used as an alternative to the frame whenever the plug is arranged, for example, with its bottom side on a carrier plate for constructing a flat detector via which electrical contact is made with the detector module.

However, the frame-type variant of the plug is preferred, particularly when, according to one embodiment of the invention, the detector module includes a second printed circuit board that is arranged below the first printed circuit board. The second printed circuit board is connected via the plug to the first printed circuit board in such a way that electric signals can be transmitted from one printed circuit board to the other.

According to one variant of at least one embodiment of the invention, the provision of a second printed circuit board renders it possible in addition for a number of components used for signal processing preferably to be arranged in the vicinity of the array of detector elements. According to one embodiment of the invention, the components used for signal processing are arranged on the side of the second printed circuit board facing the first printed circuit board and are held in the free space of the plug.

If required, it is also possible for further printed circuit boards to be provided that are electrically connected in each case via a plug having a free space. When it is mentioned above that electric signals are transmitted between the printed circuit boards, this means not only the transmission of signals measured with the aid of the array of detector elements, but also the transmission of supply currents or supply voltages as well as, if appropriate also of control signals for electronic components present on the printed circuit boards.

Variants of at least one embodiment of the invention provide that at least one ASIC is arranged on the first printed circuit board and/or on the second printed circuit board in such a way that the latter does not project beyond the free space. If the ASICs arranged on the two printed circuit boards face one another, the dimensions of the plug are designed in such a way that the ASICs of the two printed circuit boards do not touch one another and exert no mutual influence. If further electronic components are present on the printed circuit boards, the latter are also held entirely in the free space.

According to one embodiment of the invention, an intermediate plate which exhibits a material that is a good thermal conductor is arranged between the first and the second printed circuit board. The ASICs of the two printed circuit boards preferably bear against the intermediate plate such that the waste heat generated during operation of the detector module or of the ASIC can be dissipated via the intermediate plate. Embodiments of the invention provide in this case that the intermediate plate is constructed from a metal, for example from copper or from aluminum.

According to a further variant of at least one embodiment of the invention, the detector module is arranged on a carrier plate which likewise exhibits a material that is a good thermal conductor. In this case, the carrier plate can be coated with tracks made from a material such as copper that is a good thermal conductor, or else be constructed completely from such a material. According to one embodiment of the invention, so that the waste heat generated during operation of the detector module can be effectively dissipated from the detector module via the carrier plate, the detector module is fastened on the carrier plate with the aid of suitable connecting means that are good thermal conductors.

According to one variant of at least one embodiment of the invention, screws made from a metallic material have proved in this case to be suitable connecting device(s) for fastening a detector module on the carrier plate. Consequently, the waste heat occurring during operation of the detector module can be dissipated continuously via the intermediate plate, the connecting device(s) and the carrier plate.

According to embodiments of the invention, the array of detector elements can be an array of detector elements based on a semiconductor material that directly convert X-radiation. The array of detector elements can, however, also have a scintillator array and a photodiode array that are aligned with one another.

Moreover, one embodiment of the invention provides that a collimator is arranged above the array of detector elements in order to promote only X-radiation of a specific spatial direction to reach the array of detector elements.

A detector for X-radiation that has a number of the detector modules described above. It is preferred here for a number of detector modules to be arranged on a carrier plate. In accordance with one embodiment of the invention, the carrier plate is designed in such a way that a number of detector modules are arranged in sequence on the carrier plate. Finally, in order to construct a flat detector a number of carrier plates with detector modules are arranged next to one another. When the detector is provided for a computed tomography unit, the carrier plates aligned in the direction of the system axis of the computed tomography unit and provided with detector modules are placed on a detector arc next to one another in the f-direction such that a partial cylindrical surface is fitted with detector modules.

BRIEF DESCRIPTION OF THE DRAWINGS

An example embodiment of the invention is illustrated in the attached schematics, in which:

FIG. 3 shows an exploded, perspective illustration of the detector module from FIG. 2, and FIG. 4 shows a box-type plug.

DETAILED DESCRIPTION OF THE EXAMPLE EMBODIMENTS

Figure 1:
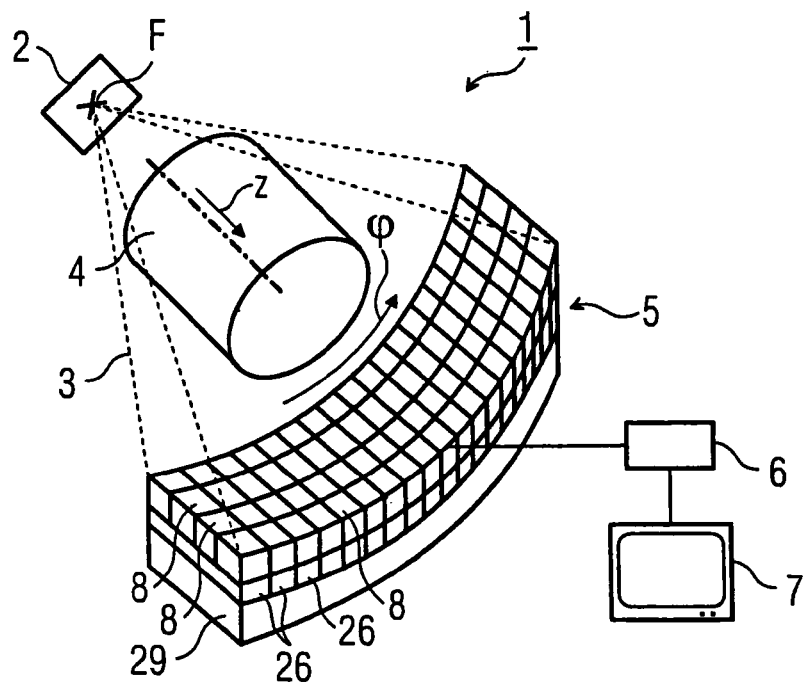
FIG. 1 shows a schematic, partially in the form of a block diagram, of a computed tomography unit.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described.

FIG. 1 is a schematic, partially in the form of a block diagram, of a computed tomography unit 1. The computed tomography unit 1 includes an X-ray source 2 from the focus F of which there emanates an X-ray beam 3 that is shaped as a fan or pyramid, for example, with the aid of collimators known per se (but not illustrated in FIG. 1). The X-ray beam 3 penetrates an examination object 4 to be examined, and strikes an X-ray detector 5. The X-ray source 2 and the X-ray detector 5 are arranged (in a way not illustrated in FIG. 1) opposite one another on a rotary frame of the computed tomography unit 1, which rotary frame can be rotated in the φ-direction about the system axis Z of the computed tomography unit 1.

During operation of the computed tomography unit 1, the X-ray source 2 arranged on the rotary frame and the X-ray detector 5 rotate about the examination object 4, X-ray pictures of the examination object 4 being obtained from different projection directions. By projection, in this case X-radiation that has past through the examination object 4 and been attenuated by the passage through the examination object 4 strikes the X-ray detector 5, the X-ray detector 5 generating signals that correspond to the intensity of the incident X-radiation. In a way known per se, an image computer 6 uses the signals determined with the aid of the X-ray detector 5 to calculate one or more two- or three-dimensional images of the examination object 4 that can be displayed on a monitor 7.

In the case of the present example embodiment, the X-ray detector 5 has a multiplicity of detector modules 8 that are arranged next to one another in the f-direction and in the Z-direction on a detector base 29 that constitutes a partial cylindrical surface, and form the planar X-ray detector 5.

Figure 2:
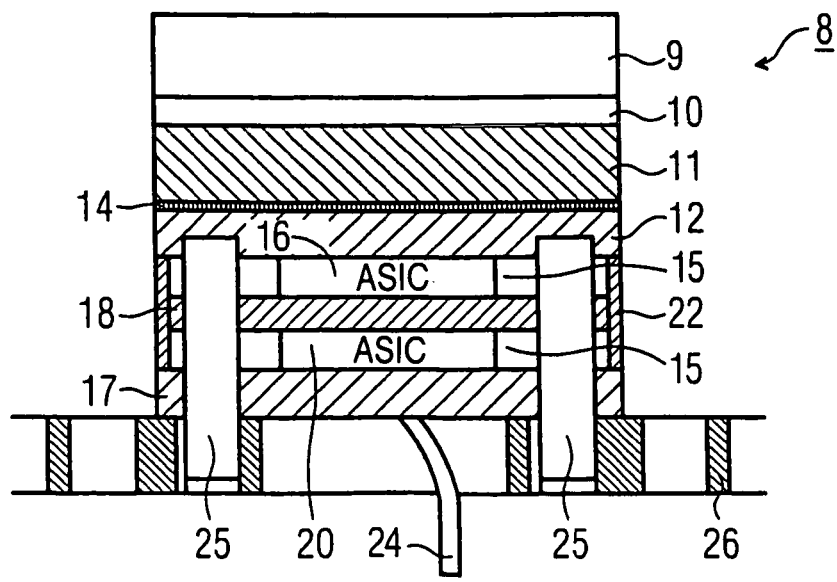
FIG. 2 shows a sectional illustration of a detector module of the computed tomography unit from FIG. 1.

A detector module 8 of the X-ray detector 5 is shown in FIG. 2 by way of example in a sectional illustration. The detector module 8 has a vertical construction, a scintillator array 10 being arranged over a photodiode array 11. A collimator 9 is present above the scintillator array 10 such that only X-radiation from a specific spatial direction can arrive at the scintillator array 10. The scintillator array 10 is structured and consequently it comprises a multiplicity of scintillator elements (not illustrated in more detail) that are respectively assigned to a photodiode of the photodiode array 11, which comprises a multiplicity of photodiodes. The scintillator array 10 and the photodiode array 11 are aligned relative to one another and bonded to one another. The scintillator array 10 and the photodiode array 11 thus form an array of detector elements for X-radiation, a detector element having a scintillator element and a photodiode.

The photodiode array 11 is arranged on a first printed circuit board 12 in the case of the present example embodiment. As is to be seen from FIG. 3, the printed circuit board 12 has solder fields 13, so-called solder pads, on the side facing the photodiode array 11. The photodiodes of the photodiode array 11, which are arranged on a HTCC (High Temperature Cofired Ceramic) carrier material in the case of the present exemplary embodiment, are electrically connected to the solder fields 13 of the printed circuit board 12 via solder globules 14 on the underside of the HTCC carrier material.

The printed circuit board 12 has on its side averted from the photodiode array 11 electrical and electronic components that are required for processing the measuring signals supplied by the photodiodes, and which are connected to individual conductor tracks (not shown) for the purpose of making electrical contact. In a way not illustrated explicitly, the conductor tracks are electrically connected to the solder fields 13 by means of plated holes through the printed circuit board 12. The components for signal processing comprise, in particular, at least one ASIC 16, but also other components not explicitly illustrated such as, for example, capacitors for stabilizing the supply voltage, amplifier circuit etc.

In the case of the present example embodiment, a second printed circuit board 17 is arranged below the first printed circuit board 12 in order to make available further surfaces for arranging signal processing electronic systems near the detector array. This is frequently required, since, as mentioned at the beginning, the electronic system that is to be arranged for measuring reasons as closely as possible to the photodiodes and is intended for processing the measuring signals supplied by the photodiodes requires an area that can be twice to four times greater than the detection surface of a detector module 8 itself.

In the case of the present example embodiment, the second printed circuit board 17 is arranged underneath the printed circuit board 12 and over an intermediate plate 18. In the case of the present example embodiment, the second printed circuit board 17 likewise has on its side facing the first printed circuit board 12 conductor tracks and components for signal processing which include an ASIC 20 in the case of the present example embodiment.

Both on the first printed circuit board 12 and on the second printed circuit board 17, conductor tracks lead, in a manner not illustrated in the figures, to the edges of the respective printed circuit board 12, 17. The electrical interconnection of the printed circuit boards 12, 17 is preferably performed via a frame-type plug 22 providing a free space 15. To this end, the mutually facing sides of the printed circuit boards 12, 17 have plug-in contacts 23 that respectively cooperate with plug-in contacts 19 of the frame-type plug 22, which are present on both sides of the frame-type plug 22 and are interconnected. The plug-in contacts 23 of the second printed circuit board 17 are to be seen in FIG. 3.

The frame-type design, exhibiting a free space 15, of the plug 22 renders it possible for the components used for signal processing and which are arranged on conventional printed circuit boards 12 and 17, particularly the ASICs 16 and 20, to be held in the free space 15, the result of this being not only to achieve a compact, vertical structure of the detector module 8, but also a protective action for the electronic components. The plug 22 can in this case be constructed from a plastic into which the electrical connections and plug-in contacts 19 are introduced.

For the purpose of making electrical contact with the detector module 8 per se, in the case of the present example embodiment the second printed circuit board 17 has a connecting cable 24 that is electrically connected to the conductor tracks of the second printed circuit board 17 via a plated hole (not shown) through the second printed circuit board 17, and is also electrically connected to the first printed circuit board 12 via the frame-type plug 22. Consequently, measuring signals generated by the photodiodes can be preprocessed with the aid of the components of the two printed circuit boards 12, 17 and are transmitted via the cable 24 to the electronic system for further signal processing that is downstream of the detector module 8, until the conditioned measuring signals finally reach the computer 6. The conditioned measuring signals are led in this case to the image computer 6 via an interface (not shown) between the rotating part of the computed tomography unit 1 and the stationary part of the computed tomography unit 1, in the case of which slip rings are involved, for example.

Moreover, in the assembled state of the detector module 8 the intermediate plate 18 already mentioned is held in the frame-type plug 22. To be specific, the ASICs 16, 20 of the two printed circuit boards 12, 17 are held in this case in the free space 15 in such a way that the latter bear against the intermediate plate 18. Since the intermediate plate 18 exhibits a material that is a good thermal conductor, that is to say either it is coated with such a material or, as in the case of the present example embodiment, is constructed completely from a metal, for example copper or aluminum, it is possible in this way for the waste heat generated during operation of the detector module 8, specifically the ASICs 16, 20 to be dissipated from the detector module 8. This is achieved, inter alia, by virtue of the fact that the first printed circuit board 12 with the detector array, the intermediate plate 18 and the second printed circuit board 17 are fastened with the aid of metal screws 25 to a carrier plate 26 that likewise exhibits a material that is a good thermal conductor. In order to dissipate the heat, the carrier plate 26 has either heat conducting tracks made from a metallic material, for example copper, or, as in the case of the present example embodiment, is constructed entirely from a material that is a good thermal conductor, preferably a metal.

As is to be gathered from FIG. 3, the carrier plate 26 has a number of places (five places in the case of the present exemplary embodiment) for detector modules 8, it being possible for the detector modules 8 to be arranged on the carrier plate 26 in such a way that a detector plate or a detector module row is formed without appreciable interspaces between the detector modules 8. For the X-ray detector 5 of the computed tomography unit 1 from FIG. 1, a number of such detector module rows aligned in the direction of the system axis Z of the computed tomography unit 1 are arranged next to one another in the φ-direction on the detector arc 29.

The described construction of a detector module 8 has the particular advantage that the latter can be constructed in a very compact fashion with a slight extent in the direction of the dominant centrifugal force, which corresponds to the direction of the normal to the detector module 8. It is thereby possible to construct the X-ray detector with a lower overall weight, the result being to reduce the rotating mass, which is increased by a multiple during operation at high rotational speeds of the X-ray detector. Owing to the lesser mechanical loading as a consequence of the lighter construction, there are reductions in sagging phenomena; the X-ray detector 5 thus remains more true to size and more positionally accurate during operation. Consequently, owing to the correspondingly large design of the X-ray detector 5 not only is it possible to enlarge the coverage in the direction of the system axis Z, but there is also an improvement in the quality level of the signals because of the short lengths of the signal lines inside the detector, and fewer microphonic effects occur.

Should even more space be required for a signal processing electronic system in a detector module, the described arrangement can also be further extended by one or more printed circuit boards in a vertical arrangement, in the way described.

However, the detector module can also include only one printed circuit board that is generally arranged on the carrier plate without an intermediate plate when the signal processing electronic system requires only little space. As an alternative to a frame-type plug, it is possible in this case to use the box-type plug 30 that is shown in FIG. 4 and which in addition to a free space 31 has plug-in contacts 32 for connection to the printed circuit board. The plug is arranged on the carrier plate 26 with its base plate 33, which can likewise optionally have plug-in contacts.

The arrangement of the intermediate plate between the first and the second printed circuit board is only optional, and can therefore also be omitted.

Again, the detector modules need not necessarily be screwed to the carrier plate. Rather, they can also be arranged on the carrier plate with the aid of retainers or in some other way.

Instead of having an array of detector elements, which includes a scintillator array and a photodiode array, the detector module can also have an array of detector elements that directly convert X-ray radiation.

Embodiments of the invention has been described above in conjunction with a computer tomography unit. However, the detector module and the detector can also be used with other X-ray equipment, for example with a C arc Xray machine.

Further, elements and/or features of different example embodiments may be combined with each other and/or substituted for each other within the scope of this disclosure and appended claims.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A detector for X-radiation comprising:
   a number of detector modules; and
   at least one carrier plate on which the number of detector modules are arranged, each of the number of detector modules including,
      an array of detector elements,
      a first printed circuit board, the array of detector elements being arranged on a first side of the first printed circuit board, and at least one component usable for signal processing being arranged on a second side of the first printed circuit board, the first printed circuit board making electrical contact with a plug connector having a free space in which the at least one component is held,
   a second printed circuit board, arranged below the first printed circuit board, the second printed circuit board being connected to the first printed circuit board via the plug in such a way that electric signals is transmissible between the first and second printed circuit boards, wherein
      at least one component used for signal processing is arranged on the second printed circuit board,
      the component arranged on the second printed circuit board and usable for signal processing is arranged on the side of the second printed circuit board which faces the first printed circuit board and is held in the free space of the plug, and
      the first printed circuit board makes direct electrical contact with the plug connector.

2. The detector as claimed in claim 1, wherein the plug is at least one of a frame-type design and a box-type design.

3. The detector as claimed in claim 1, wherein at least one ASIC is arranged on the first printed circuit board in such a way that it does not project beyond the free space.

4. The detector as claimed in claim 1, wherein at least one ASIC is arranged on the second printed circuit board in such a way that it does not project beyond the free space.

5. The detector as claimed in one claim 1, wherein an intermediate plate which exhibits a material that is a good thermal conductor is arranged between the first and the second printed circuit board.

6. The detector as claimed in claim 5, wherein the intermediate plate is made from a metal.

7. The detector as claimed in claim 5, wherein the intermediate plate is constructed from copper or aluminum.

8. The detector as claimed in claim 5, wherein at least one ASIC bears against the intermediate plate.

9. The detector as claimed in claim 1, wherein the detector module is arranged on the carrier plate which exhibits a material that is a good thermal conductor.

10. The detector as claimed in claim 9, wherein the detector module is fastened on the carrier plate with the aid of at least one connecting device in such a way that waste heat generated during operation of the detector module is dissipated from the detector module via the carrier plate.

11. The detector as claimed in claim 10, wherein the detector module is screwed to the carrier plate.

12. The detector as claimed in claim 9, wherein the detector module is screwed to the carrier plate.

13. The detector as claimed in claim 1, wherein the array of detector elements is an array of detector elements that directly convert X-radiation.

14. The detector as claimed claim 1, wherein the array of detector elements has a scintillator array and a photodiode array.

15. The detector as claimed in claim 1, further comprising a collimator, arranged above the array of detector elements.

16. The detector as claimed in claim 1, wherein the detector modules are arranged in sequence on the carrier plate.

17. The detector as claimed in claim 16, wherein a number of carrier plates with detector modules are arranged next to one another.

18. The detector as claimed in claim 1, wherein a number of carrier plates with detector modules are arranged next to one another.

19. The detector as claimed in claim 18, wherein the carrier plates are arranged on a detector arc.

20. A computed tomography unit comprising a detector as claimed in claim 1.

21. A detector module, comprising:
a first printed circuit board;
an array of detector elements arranged on a first side of the first printed circuit board;
at least one signal processing component arranged on a second side of the first printed circuit board; and
a second printed circuit board electrically connected to the first printed circuit board via a plug connector, the plug connector being a frame-type plug connector having a free space in which the at least one signal processing component is arranged, the frame-type plug connector enclosing the at least one signal processing component arranged in the free space.

22. The detector module as claimed in claim 21, wherein the second printed circuit board is arranged below the first printed circuit board, the second printed circuit board being connected to the first printed circuit board via the plug connector such that electric signals are transmissible between the first and second printed circuit boards.

23. The detector module as claimed in claim 21, wherein a component usable for signal processing is arranged on a side of the second printed circuit board, which faces the first printed circuit board and is held in the free space of the plug connector.

24. A detector module, comprising:
a first printed circuit board;
an array of detector elements arranged on a first side of the first printed circuit board;
a first signal processing component arranged on a second side of the first printed circuit board, the second side being opposite to the first side;
a second printed circuit board electrically connected to the first printed circuit board;
a second signal processing component arranged on a first side of the second printed circuit board, the first side of the second printed circuit board facing the second side of the first printed circuit board;
a plug connector electrically connecting the first and second printed circuit boards, the plug connector being a frame-type plug connector having a free space in which the first and second signal processing components are arranged, the frame-type plug connector enclosing the first and second signal processing components arranged in the free space.

* * * * *